(12) United States Patent
Rasmussen

(10) Patent No.: US 7,960,850 B2
(45) Date of Patent: Jun. 14, 2011

(54) PRIORITY SYSTEM FOR COMMUNICATION IN A SYSTEM OF AT LEAST TWO DISTRIBUTED WIND TURBINES

(75) Inventor: Keld Rasmussen, Herning (DK)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 12/396,136

(22) Filed: Mar. 2, 2009

(65) Prior Publication Data
US 2009/0160189 A1    Jun. 25, 2009

Related U.S. Application Data

(63) Continuation of application No. PCT/DK2007/000317, filed on Jun. 28, 2007.

(51) Int. Cl.
*F03D 9/00* (2006.01)
*H02P 9/04* (2006.01)
*H04L 12/413* (2006.01)
*H04J 3/02* (2006.01)

(52) U.S. Cl. .......................... 290/44; 370/447; 370/462
(58) Field of Classification Search .................... 290/44; 370/447, 462
See application file for complete search history.

(56) References Cited

U.S. PATENT DOCUMENTS

| | | | | |
|---|---|---|---|---|
| 4,536,877 A * | 8/1985 | Livingston et al. | ........... | 714/749 |
| 4,568,930 A * | 2/1986 | Livingston et al. | ........... | 370/462 |
| 4,623,886 A * | 11/1986 | Livingston | ........... | 370/462 |
| 4,719,458 A * | 1/1988 | Miesterfeld et al. | ........... | 710/240 |
| 4,739,402 A * | 4/1988 | Maeda et al. | ........... | 348/468 |
| 4,897,833 A * | 1/1990 | Kent et al. | ........... | 370/447 |
| 4,970,716 A * | 11/1990 | Goto et al. | ........... | 370/466 |
| 5,077,733 A * | 12/1991 | Whipple | ........... | 370/438 |
| 5,319,641 A * | 6/1994 | Fridrich et al. | ........... | 370/447 |
| 5,353,287 A * | 10/1994 | Kuddes et al. | ........... | 370/448 |
| 5,826,017 A * | 10/1998 | Holzmann | ........... | 709/230 |
| 5,852,723 A * | 12/1998 | Kalkunte et al. | ........... | 709/235 |
| 6,111,888 A * | 8/2000 | Green et al. | ........... | 370/461 |
| 6,253,260 B1 * | 6/2001 | Beardsley et al. | ........... | 710/5 |
| 6,272,147 B1 * | 8/2001 | Spratt et al. | ........... | 370/447 |
| 6,925,385 B2 * | 8/2005 | Ghosh et al. | ........... | 702/14 |
| 6,966,754 B2 * | 11/2005 | Wobben | ........... | 416/61 |

(Continued)

FOREIGN PATENT DOCUMENTS

DE    102004060943 A1    7/2006

(Continued)

OTHER PUBLICATIONS

International Search Report, Oct. 25, 2007 (2 pages).

(Continued)

*Primary Examiner* — Pedro J Cuevas
(74) *Attorney, Agent, or Firm* — St. Onge Steward Johnston & Reens LLC

(57) ABSTRACT

The invention relates to a system of at least two distributed wind turbines where the at least two wind turbines communicate via a data communication network, the data communication network communicates monitoring and control data (MCD) to and from the at least two wind turbines (WT), the data communication network communicates power control related data (PCRD) to and from the at least two wind turbines (WT), the power control related data (PCRD) has higher transmission priority than a subset of the monitoring and control data (MCD) and where the transmission priority is defined in relation to a protocol.

17 Claims, 5 Drawing Sheets

U.S. PATENT DOCUMENTS

| | | | | |
|---|---|---|---|---|
| 7,013,203 | B2 * | 3/2006 | Moore et al. | 700/286 |
| 7,298,698 | B1 * | 11/2007 | Callum | 370/231 |
| 7,346,462 | B2 | 3/2008 | Delmerico | 702/60 |
| 7,603,202 | B2 | 10/2009 | Weitkamp | 700/287 |
| 7,693,061 | B2 * | 4/2010 | El-Sakkout et al. | 370/235 |
| 7,706,398 | B2 * | 4/2010 | Jung et al. | 370/447 |
| 2002/0029097 | A1 * | 3/2002 | Pionzio, Jr. et al. | 700/286 |
| 2002/0090001 | A1 | 7/2002 | Beckwith | 370/466 |
| 2003/0014219 | A1 | 1/2003 | Shimizu et al. | 702/184 |
| 2004/0015609 | A1 | 1/2004 | Brown et al. | 709/246 |
| 2004/0230377 | A1 * | 11/2004 | Ghosh et al. | 702/3 |
| 2005/0090937 | A1 * | 4/2005 | Moore et al. | 700/286 |
| 2006/0171410 | A1 * | 8/2006 | Jung et al. | 370/447 |
| 2006/0273595 | A1 | 12/2006 | Avagliano et al. | 290/44 |
| 2009/0160187 | A1 * | 6/2009 | Scholte-Wassink | 290/44 |
| 2009/0204266 | A1 * | 8/2009 | Lovmand et al. | 700/287 |
| 2009/0234510 | A1 * | 9/2009 | Helle et al. | 700/287 |
| 2009/0254224 | A1 * | 10/2009 | Rasmussen | 700/287 |
| 2009/0281675 | A1 * | 11/2009 | Rasmussen et al. | 700/287 |
| 2010/0067526 | A1 * | 3/2010 | Lovmand | 370/389 |
| 2010/0138182 | A1 * | 6/2010 | Jammu et al. | 702/113 |
| 2010/0268849 | A1 * | 10/2010 | Bengtson et al. | 709/248 |
| 2010/0274400 | A1 * | 10/2010 | Ormel et al. | 700/287 |
| 2010/0274401 | A1 * | 10/2010 | Kjaer et al. | 700/287 |
| 2010/0305767 | A1 * | 12/2010 | Bengtson | 700/287 |
| 2010/0312410 | A1 * | 12/2010 | Nielsen | 700/287 |
| 2011/0020122 | A1 * | 1/2011 | Parthasarathy et al. | 416/61 |
| 2011/0035068 | A1 * | 2/2011 | Jensen | 700/287 |

FOREIGN PATENT DOCUMENTS

| | | |
|---|---|---|
| EP | 1519040 A1 | 3/2005 |
| EP | 1531376 A1 * | 5/2005 |
| WO | 0177525 A1 * | 10/2001 |
| WO | 03029648 A1 | 4/2003 |
| WO | 03077048 A1 | 9/2003 |
| WO | 2005042971 A1 | 5/2005 |
| WO | 2005047999 A1 | 5/2005 |
| WO | 2005055538 A1 | 6/2005 |

OTHER PUBLICATIONS

International Preliminary Report on Patentability & Written Opinion of the International Searching Authority; PCT/DK2007/0003171; Mar. 3, 2009; 7 pages.

International Standard IEC 61400-25—Information and Information Exchange for Wind Power Plants; 1CD for 61400-25; IEC 2003; 4 pages.

* cited by examiner

US 7,960,850 B2

PRIORITY SYSTEM FOR COMMUNICATION IN A SYSTEM OF AT LEAST TWO DISTRIBUTED WIND TURBINES

CROSS-REFERENCE TO RELATED APPLICATIONS

The present application is a continuation of pending International patent application PCT/DK2007/000317 filed on Jun. 28, 2007 which designates the United States and claims priority from Danish patent application PA 2006 01133 filed on Sep. 1, 2006, the content of which is incorporated herein by reference.

FIELD OF THE INVENTION

The invention relates to a system of at least two distributed wind turbines wherein said at least two wind turbines communicate via data communication network (DCN); wherein said data communication network communicates monitoring and control data (MCD) to and from said at least two wind turbines (WT); said data communication network communicates power control related data (PCRD) to and from said at least two wind turbines (WT); said power control related data (PCRD) has higher transmission priority than a subset of said monitoring and control data (MCD) and wherein said transmission priority is defined in relation to a protocol.

BACKGROUND OF THE INVENTION

The strategically distributed nature of wind power presents unique challenges. A wind park comprises several wind turbines and is often located offshore, and it often covers large geographic areas.

These factors usually require a variety of networked interconnections and telecommunication technologies for monitoring and controlling wind power electric generating facilities referred to as SCADA (SCADA: Supervisory Control And Data Acquisition).

The prior art presents several ways of controlling a wind turbine and wind parks. U.S. Pat. No. 6,966,754 teaches a method for monitoring wind turbines, by means of image and acoustic monitoring. This is an example of a wind turbine to control itself on the basis of dynamical measurement of factors within the wind turbine. European patent application EP 1519040 discloses a method for a remote reading and changing of power settings in wind turbine generators. Moreover, international patent application WO 01/77525 discloses a typical Supervisory Command And Data Acquisition system with SCADA elements.

SUMMARY OF THE INVENTION

The invention relates to a system of at least two distributed wind turbines wherein said at least two wind turbines communicates via a data communication network wherein
  said data communication network communicates monitoring and control data (MCD) to and from said at least two wind turbines (WT),
  said data communication network communicates power control related data (PCRD) to and from said at least two wind turbines (WT) and wherein
  said power control related data (PCRD) has higher transmission priority than a subset of said monitoring and control data (MCD)
  said transmission priority is defined in relation to a protocol According to the present invention a data communication network is understood as any data network communicating data in a system of distributed wind turbines. An example of a data communication network is a SCADA (SCADA: Supervisory Command And Data Acquisition) system. A SCADA system is a category of software application programs for process control, the gathering of data potentially in real time from remote locations in order to control equipment and conditions and the network associated with this.

SCADA systems include hardware and software components. The hardware gathers and feeds data into a computer that has SCADA software installed. The computer then processes this data. SCADA also records and logs all events into a log file or a database or sends them to a printer. SCADA further warns or performs active actions when conditions become critical or hazardous.

The power control related data may according to the present invention comprise data that interferes with the control of power in a wind turbine or wind farm. This may be data comprising information about active power, reactive power or run state of a wind turbine.

In an embodiment of the invention, said power control related data (PCRD) having high transmission priority comprises information about active power.

In an embodiment of the invention, said power control related data (PCRD) having high transmission priority comprises information about reactive power.

In an embodiment of the invention, said power control related data comprises Power Factor regulation data, i.e. data transmitted to relevant parts of the wind turbine power system for the purpose of controlling the resulting power factor from one or several wind turbines.

In an embodiment of the invention, Power Factor regulation data comprises Power Factor set point(s).

In an embodiment of the invention, said monitoring and control data (MCD) is transmitted to and from said at least two wind turbines (WT) via a data communication network (DCN)

In an embodiment of the invention, said data communication network is a copper, fiber or wireless network or a combination of these.

In an embodiment of the invention, said power control related data having higher transmission priority is transmitted via a further network (FN).

By transmitting data packets containing critical data via a separate network the priority is defined at the source, e.g. the control station, or in the wind turbine controller related to a wind turbine by means of sending the packet on the normal data communication network or on the further network. If a data packet is sent on the further, and faster, network, the data will be transmitted faster than if it is sent on the normal network.

In an embodiment of the invention, said monitoring and control data (MCD) and the power control related data (PCRD) having higher transmission priority is transmitted via the same data communication network (DCN) as data packets having different priorities.

According to the invention the transferring of data via the same network is very advantageous in many ways. No additional cabling is needed and no extra ports and device drivers for these ports are needed compared to establishing and using a further network. According to the present invention it is extremely advantageous to the operation of a wind park to let critical data be transmitted faster than less critical data in that only few seconds of delay may have fatal consequences. By applying the present invention in a wind park critical data, e.g. power control related data, will be transmitted fast and independently of the traffic on the network. It should be noted that there may exist several levels of priority in accordance with the present invention, e.g. 9 levels where a data packet having priority level 1 is having higher transmission priority than a data packet having transmission priority 2 and a data packet having transmission priority 3 or vice versa.

In an embodiment of the invention, said at least two wind turbines comprising means for encoding data packets including a specification of priority level.

In an embodiment of the invention, said at least two wind turbines comprising means for decoding data packets including a detection of priority level.

It is within the scope of the invention that encoding of data packets includes a specification of priority level. This encoding may be done in several ways, e.g. by accessing the Data-Link layer with reference to the OSI (Open Systems Interconnection) reference model. This may be done by means of the GOOSE/GSSE protocol according to IEC 61850. Another way of implementing priority is by the use of two different protocols on the same data communication network DCN. Software controlling intersection points of the system, e.g. the software of switches or wind turbine controllers, may parse and process data from one protocol before parsing a data packet from another protocol having lover transmission priority.

In an embodiment of the invention said power control related data comprises at least one representation of one or more measurements relating to the wind turbine. These measurements may be established by one or more sensors located within the wind turbine or located externally.

In an embodiment of the invention, said power control related data comprises a value from one or several sensors or measurements from the wind turbine.

Transmission data from one of the sensors or measurements, e.g. the active power, may be very critical and important. In an embodiment of the present invention, this critical data is transmitted very fast to e.g. a power control system (may be the SCADA server or control station) of a wind park.

In an embodiment of the invention, said monitoring and control data (MCD) are transmitted as data packets associated with priorities.

In an embodiment of the invention, said monitoring and control data (MCD) are transmitted as data packets associated with priorities and wherein said data packets are encoded according to a single protocol incorporating priorities.

According to an embodiment of the invention, the protocol allows incorporation of priorities of power related control data into data packets, thereby allowing a data packet encoded according to the protocol to define its own priority.

According to an embodiment of the invention each data packet designates a priority or a degree of priority explicitly.

According to a further embodiment of the invention, designation of priority of the data packets may be established implicitly, e.g. by specifically designating high priority in the data packet and assuming low priority in data packets with no specific designation of priority.

Evidently, alternatively designation of priority of the data packets may be established implicitly, e.g. by specifically designating low priority in a low priority data packet and assuming high priority in data packets with no specific designation of priority.

It should be noted that data packets may also contain both high priority power control related data and low priority data. Such hybrid packets would typically be designated to be a high-priority packet.

In an embodiment of the invention, said monitoring and control data (MCD) is transmitted as data packets associated with priorities and wherein said data packets are encoded according to at least two different protocols and wherein the different protocols designates different corresponding priorities.

According to a further embodiment of the invention, priorities may be defined indirectly by use of high and low priority protocols. In other words, if a data packet is transmitted according to a first protocol, this would implicitly indicate a high priority, whereas a data packet transmitted according to a further protocol would implicitly indicate low priority or vice versa.

Evidently, as when established by direct encoding, indirect encoding of priority may also encompass more than two levels of priorities. Thus, indirect encoding of e.g. a three-level priority may be established by application of three different protocols having different priorities.

In an embodiment of the invention, said monitoring and control data (MCD) is transmitted as data packets of a single protocol associated with priorities and wherein said priorities are defined within said protocol.

Furthermore the invention relates to a wind turbine comprising at least one SCADA intersection point, said intersection point communicating with at least one data buffer (DB) buffering monitoring and control data (MCD) communicated through said intersection point, wherein said buffering of monitoring and control data (MCD) is dependent on priorities associated to said monitoring and control data (MCD).

In accordance with the present invention the intersection points may be any place where incoming data or outgoing data is handled and they are typically related to a queue or buffer. This may be in relation to the wind turbine controller.

Furthermore, the invention relates to a wind turbine comprising at least one SCADA intersection point, said intersection point communicating with at least one data buffer (DB) buffering monitoring and control data (MCD) communicated through intersection point, wherein said buffering of monitoring and control data (MCD) is dependent on priorities associated to said monitoring and control data (MCD) and wherein power control related data (PRCD) has high priority.

Moreover, the invention relates to use of priority in relation to SCADA communication of power control related data (PCRD) in a network of distributed wind turbines.

Moreover, the invention relates to a device driver of an intersection point of a wind turbine data communication network.

the device driver comprising an encoder and a decoder,
the encoder encoding monitoring and control data (MCD) according to a protocol,
the decoder decoding monitoring and control data (MCD) according to a protocol,
wherein the device driver supports priority of power control related data (PCRD).

According to the present invention the device driver supports priority in such a manner that it is able to extract priority level from a received data packet and process the data packet in such an order where the data packets with highest priorities are processed first. This may e.g. involve that power control related data has higher transmission priority than a subset of monitoring and control data. The device driver has further the ability to encode a data packet with priority definition. Furthermore, the fact that the device driver supports priority is to be understood as a support of several different protocols where the device driver processes data packets from one protocol faster than from another protocol.

In an embodiment of the invention, said encoder supports priority.

In an embodiment of the invention, said decoder supports priority.

In an embodiment of the invention, said device driver encodes at least one high priority data packet by means of simple binary digits.

It is within the scope of the present invention that data may be optimized by translating certain or all data messages into low level instructions, e.g. one or two bytes, to optimize the transmission time due to a compressed data packet.

BRIEF DESCRIPTION OF THE DRAWINGS

The invention will be described in the following with reference to the figures in which.

DETAILED DESCRIPTION OF THE INVENTION

Figure 1:
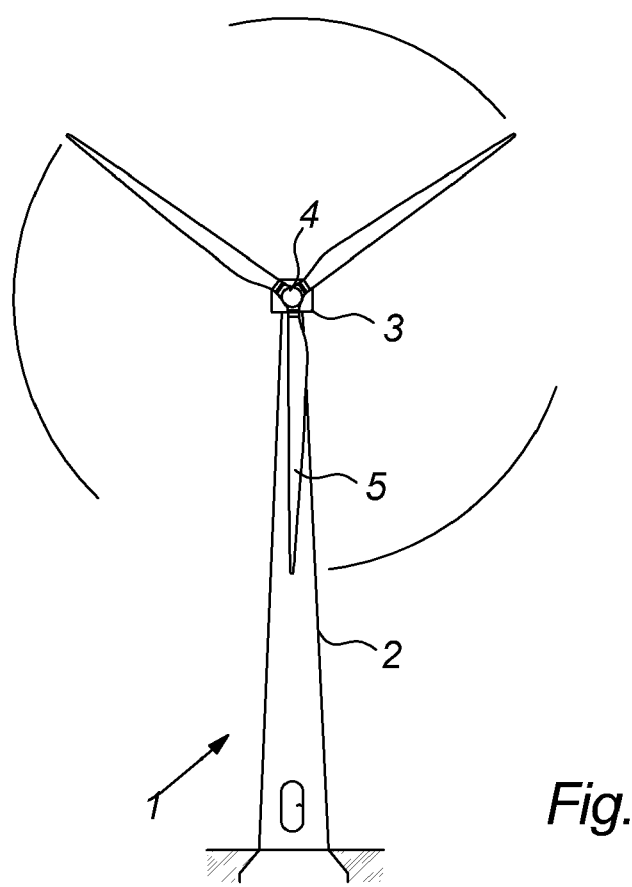
FIG. 1 illustrates a large modern wind turbine as seen from the front.

FIG. 1 illustrates a modern wind turbine 1. The wind turbine 1 comprises a tower 2 positioned on a foundation. A wind turbine nacelle 3 with a yaw mechanism is placed on top of the tower 2.

A low speed shaft extends out of the nacelle front and is connected with a wind turbine rotor through a wind turbine hub 4. The wind turbine rotor comprises at least one rotor blade e.g. three rotor blades 5 as illustrated.

Figure 2:
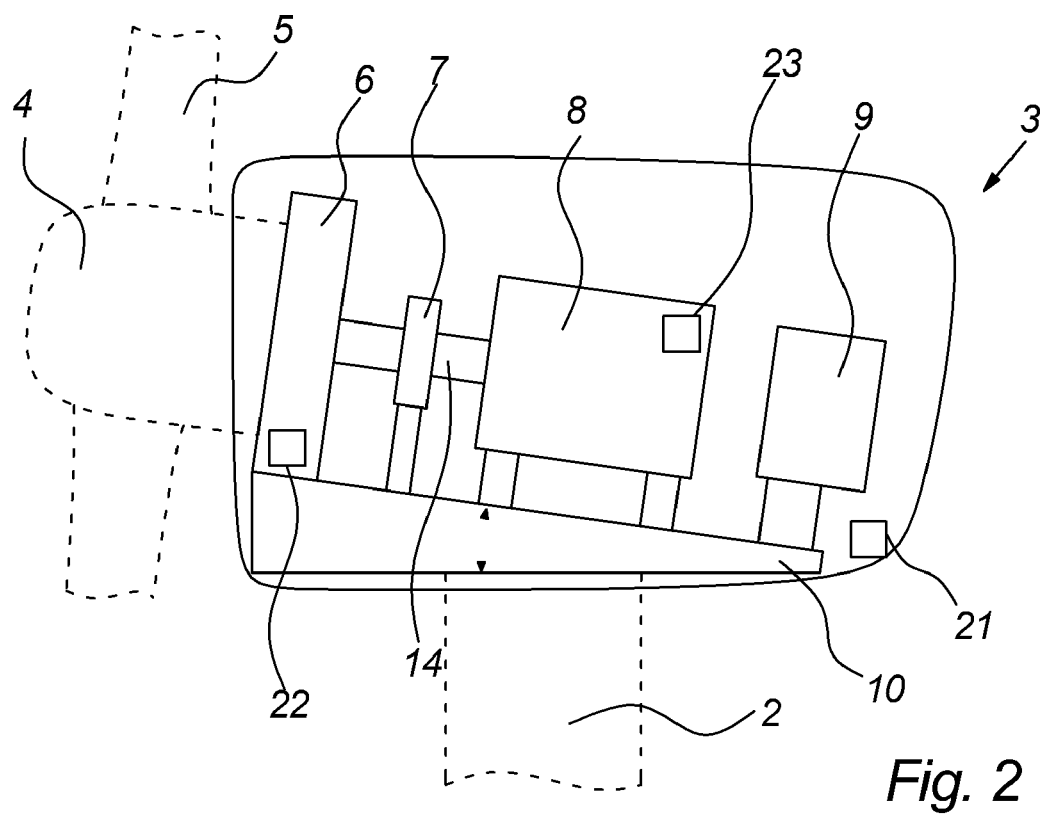
FIG. 2 illustrates a cross section of an embodiment of a simplified nacelle known in the art, as seen from the side.

FIG. 2 illustrates a simplified cross section of a nacelle 3, as seen from the side.

Nacelles 3 exists in a multitude of variations and configurations but in most cases the drive train 14 in the nacelle 3 almost always comprises one or more of the following components: a gear 6, a coupling (not shown), some sort of breaking system 7 and a generator 8. A nacelle 3 of a modern wind turbine 1 can also include a converter 9, an inverter (not shown) and additional peripheral equipment such as further power handling equipment, control cupboards, hydraulic systems, cooling systems and more.

The weight of the entire nacelle 3 including the nacelle components 6, 7, 8, 9 is carried by a load carrying structure 10. The components 6, 7, 8, 9 are usually placed on and/or connected to this common load carrying structure 10. In this simplified embodiment the load carrying structure 10 only extends along the bottom of the nacelle 3 e.g. in form of a bed frame to which some or all the components 6, 7, 8, 9 are connected. In another embodiment the load carrying structure 10 could comprise a gear bell transferring the load of the rotor 4 to the tower 2, or the load carrying structure 10 could comprise several interconnected parts such as latticework.

A typical wind turbine may further comprise a number of sensors or meters, e.g. vibration sensor 21, gear oil thermometer 22 and generator thermometer 23. It is noted that many other sensors and meters for measuring conditions of wind turbines are comprised in a typical wind turbine.

Moreover, different configurations of wind turbines may be applied within the scope of the invention, e.g. gearless wind turbines/geared wind turbines, on-board inverter/external inverter/no inverter, number of blades, etc.

Figure 3:
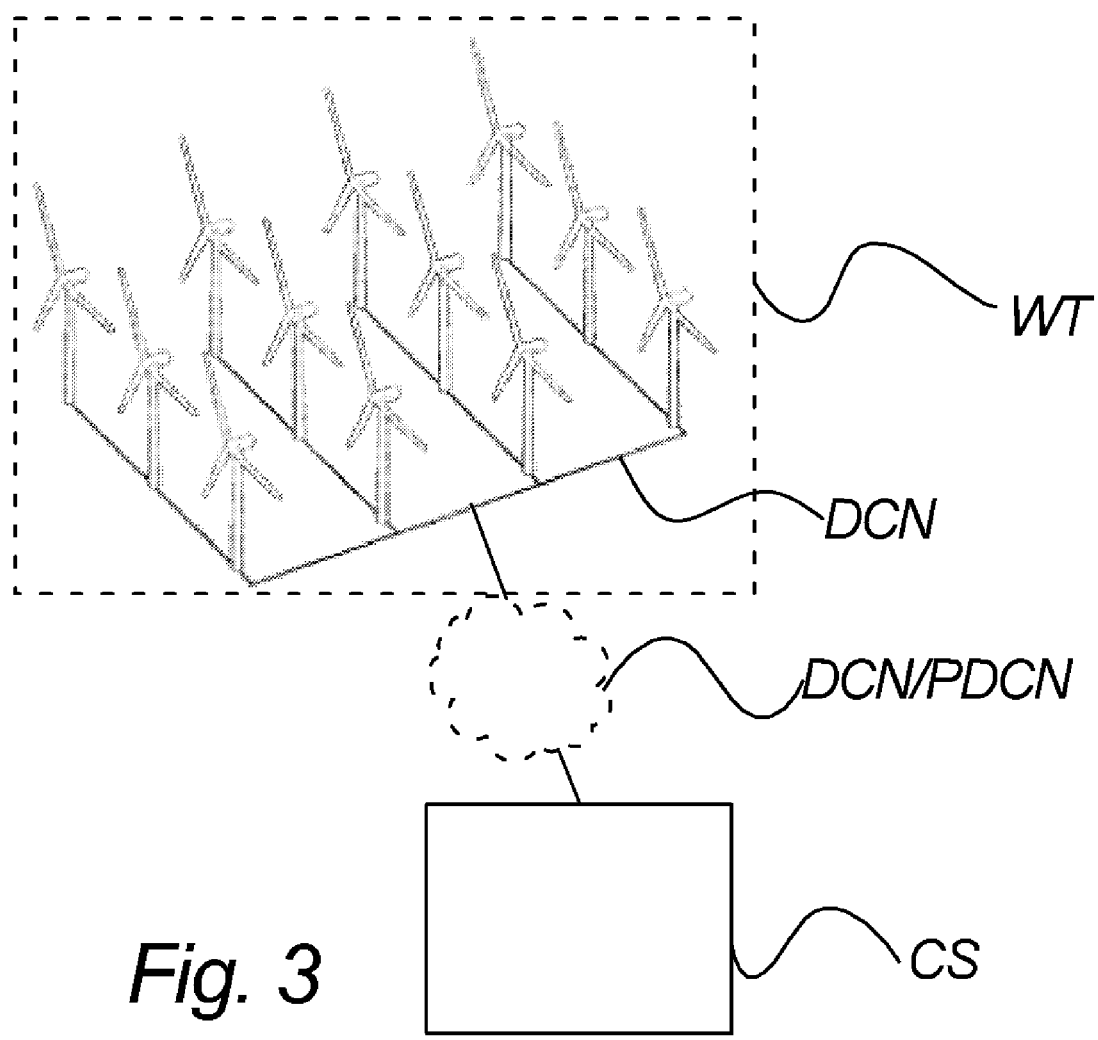
FIG. 3 illustrates an overview of a typical wind park.

FIG. 3 illustrates an overview of a typical wind farm according to the invention. A wind park comprises a number of wind turbines located in the same area in a group onshore or offshore. The wind turbines may be assembled to constitute a total unified power producing unit that can be connected to the utility grid. A wind park typically has a master or control station CS wherein a Supervisory Control And Data Acquisition (SCADA) server may be located. It should be noted that a SCADA server is an optional part of the control station. The control station may comprise a number of computers which continuously may monitor the condition of the wind turbine and collect statistics on its operation. Moreover, the control station may control the wind turbines of the wind farm WF. The control station may also control a large number of switchgears, hydraulic pumps valves, and motors within the wind turbine, typically via communication with the wind turbine controller WTC of the wind turbine. The control stations may be connected to the wind park network DCN locally or remotely via a data communication network DCN or a public data communication network PDCN, e.g. the internet. Power control related data PCRD is transmitted to and from the wind turbines WT via a data communication network DCN. The control data may typically be data to control a wind turbine. This may e.g. be instructions to a given wind turbine to change the pitch angle of the rotor blades in case of a need for a reduction in the power produced. Simultaneously, the data communication network DCN is utilized for transmitting monitoring and control data MCD to and from the wind turbines in the wind park. This may e.g. be a reading of a pressure meter of a valve of the wind turbine. The data communication network DCN may e.g. comprise a local area network LAN and/or a public data connection network, e.g. the internet.

One problem related to the prior art, is that the power control related data PCRD, which typically is very important and critical data, is subject to long transmission time due to waiting times in buffers and queues around the system. The reason for these buffers and queues to be slow is that a great volume of monitoring and control data MCD continuously will float through the system. The present invention is overcoming this problem by introducing priority into the wind turbine data communication network DCN. Thus, according to the present invention, the power control related data PCRD has higher transmission priority than a subset of said monitoring and control data MCD.

Figure 4:
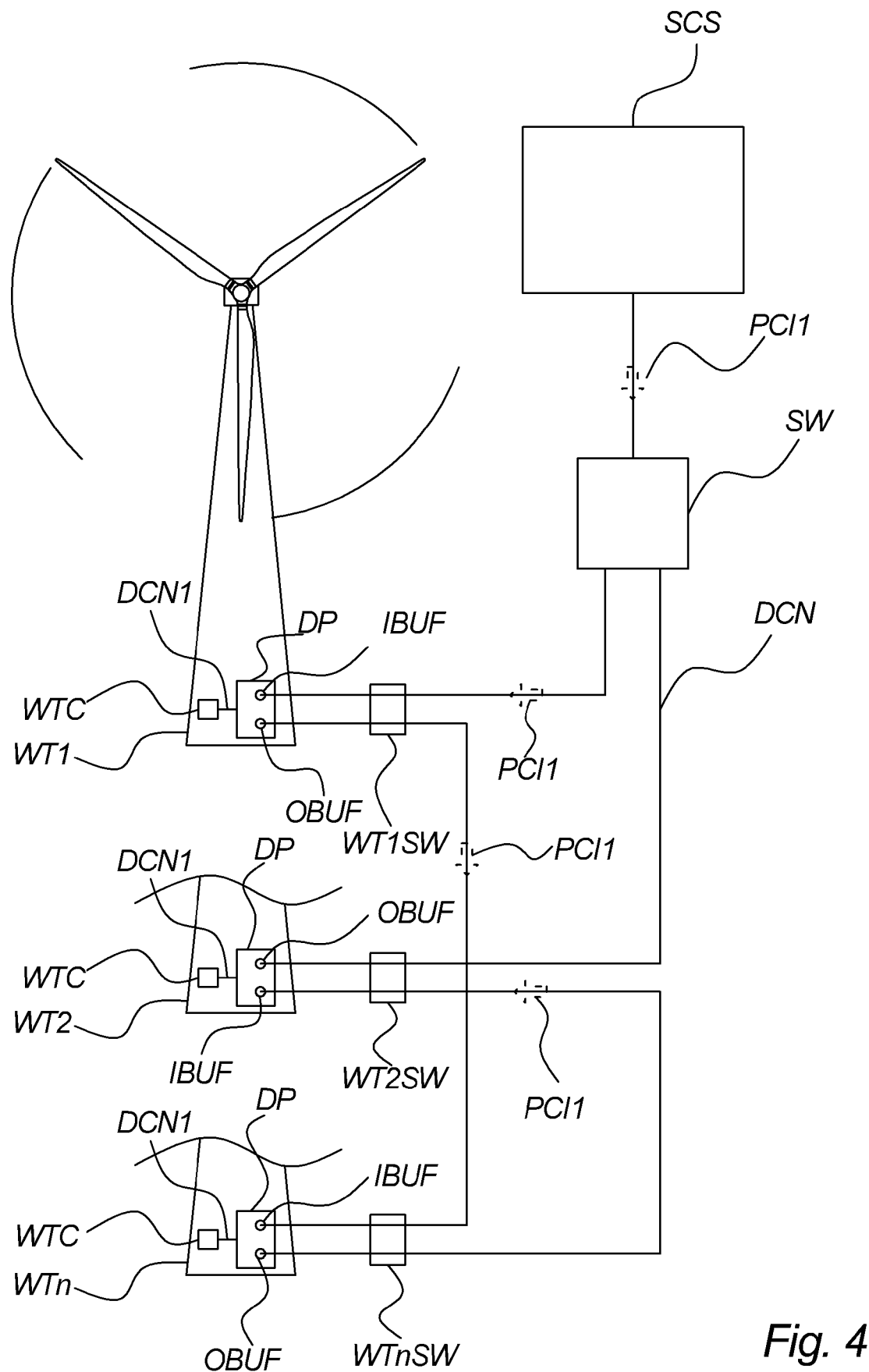
FIG. 4 illustrates the data network of a wind park according to an embodiment of the invention.

FIG. 4 illustrates the data network of a wind park according to one embodiment of the invention. The figure illustrates a number of wind turbines WT1, WT2, . . . , WTn, a central control station CS, a switch SW and wind turbine switches WT1SW, WT2SW, . . . , WTnSW. Each of the wind turbines WT1, WT2, . . . , WTn is related to a wind turbine controller WTC and a data port DP related to an input buffer IBUF and an output buffer OBUF. Furthermore, the figure illustrates power control instructions PCI1, and data communication networks DCN, DCN1.

The wind turbine switches WT1SW, WT2SW, . . . , WTnSW do in an embodiment of the present invention support transmission priority by passing data having higher transmission priority before data with lover transmission priority. The transmission priority may be designated implicitly in the data packets, e.g. by a GOOSE/GSSE data packet. The SCADA server may be comprised by a control station.

The central control station CS may in an embodiment of the invention e.g. generate a power control instruction PCI1 that in this example comprises an instruction to wind turbine no. two WT2. This power control instruction PCI1 comprises at least one data packet that may comprise power control related data PCRD and/or monitoring and control data MCD.

The wind turbine controllers and the data ports may be located inside the related wind turbines WT1, WT2, ..., WTn, e.g. in the tower, the nacelle etc., or it may be located outside the wind turbines WT1, WT2, ..., WTn.

In this figure it is illustrated that the data packet, e.g. a power control instruction PCI1, typically must pass several intersection points, a switch SW, wind turbine switches WT1SW, WTnSW, the input and output buffers IBUF OBUF of wind turbine 1 WT1, and wind turbine n WTn, to reach its destination in wind turbine 2 WT2. This may involve a delay due to the fact that many other data packets constantly are transmitted through these intersection points which in this way temporarily block the transmission of power control instruction PCI1. This could involve critical errors on the electrical output of the wind park to the utility grid.

It should be noted that the illustrated daisy chaining of network elements merely represents one of several applicable network structures.

It should furthermore be noted that the present figure is only one of several applicable data communication networks of a wind park in which the present invention may be implemented.

Figure 5:
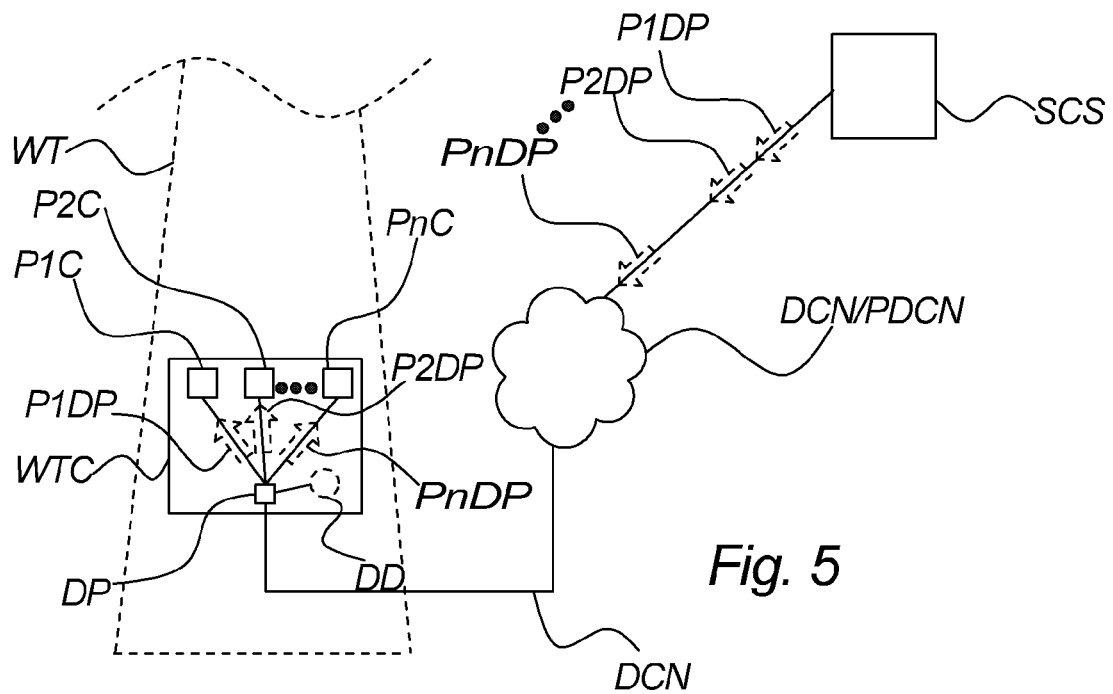
FIG. 5 illustrates a wind turbine, handling data from different protocols according to an embodiment of the invention.

FIG. 5 illustrates a wind turbine controller WTC related to a wind turbine WT according to an embodiment of the present invention. The figure further illustrates a device driver DD, a data port DP, several protocol controllers P1C, P2C, ..., PnC, data packets of different protocols P1DP, P2DP, ..., PnDP, a data communication network DCN, a public data communication network PDCN and a central control station CS.

The wind turbine controller WTC may be located inside or outside the wind turbine WT.

The figure illustrates that a device driver handles incoming power control instructions on a data port DP. The power control instructions are comprised in the data packets P1DP, P2DP, ..., PnDP and are in this example defined by different protocols. Thus, the present figure illustrates that the device driver DD supports several protocols, as in this figure is illustrated by a protocol 1 datapacket P1DP, a protocol 2 datapacket P2DP and a protocol n datapacket PnDP. The device driver transmits the incoming data packets to the correct protocol controllers P1C, P2C, ..., PnC which comprise means for decoding the instructions according to the present protocol, whereafter the instructions are to be executed in the wind turbine WT. The central control station CS may be related to a SCADA server and may be located local or remote to the wind turbine controller WTC. A central control station CS may be related to a data communication network DCN or a public data communication network PDCN.

Figure 6A:
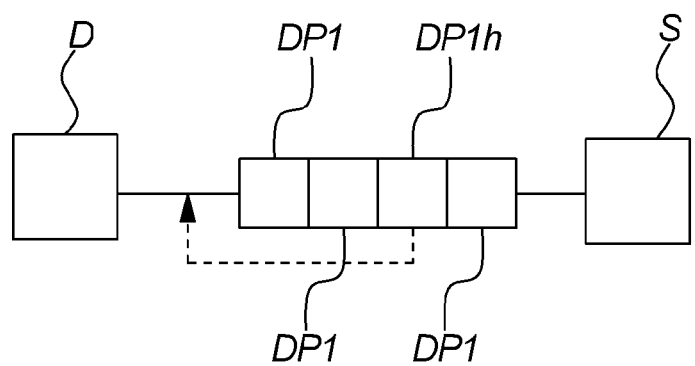
FIG. 6a illustrates an abstract overview of an example priority of data packets according to an embodiment of the invention.

FIG. 6a illustrates an abstract overview of an example priority of data packets according to an embodiment of the invention. The figure illustrates a source S, a destination D, data packets DP1, a high prioritized data packet DP1h.

Several data packets are typically continuously transmitted from a source S to a destination D. The source and the destination may both constitute a device related to a wind turbine or to any kind of control unit, e.g. a control station CS, a central control station CS, intermediate switches or a wind turbine controller WTC. The figure illustrates an example where a number of data packets DP1, PD1h in a queue or buffer are transmitted from a source S to a destination D. According to the prior art these queues or buffers are using the FIFO principles (First In, First Out), where all data bytes received in a particular sequence are further transmitted in that same order. According to the present invention, one of the data packets DP1h, is a high priority packet. This packet DP1h, is according to the invention moved to a leading position and is this way processed at the destination D faster than other data packets DP1 which will typically comprise low priority data.

Examples of low priority data are: Temperature data, Log data files e.g. comprising total run hours, summarized average values etc.

The high priority packets DP1h may typically comprise power control related data (PCRD) and the data packets DP1 with low priority data may typically comprise monitoring and control data (MCD).

Examples of data to be read in relation with a wind turbine, e.g. in a wind turbine controller WTC, to be allocated higher transmission priority are listed in the following:

"Active power measurement". Active power is the total power generated by the wind turbine to be directly used.

"Power Set Point" refers to a standard well-known measure which may e.g. involve regulation of the power factor, i.e. the relation between active and reactive power. This regulation may e.g. relate to regulation of the power performed by means of a central control unit serving two or more wind turbines. Such central control may be continuous or initiated from time to time automatically and/or manually.

"Turbine run state" comprises information of the current run state of a wind turbine e.g. if the wind turbine is shut off.

"Reactive power measurement". Reactive power is power that creates no useful work—results when current is not in phase with voltage—and can be corrected using capacitors or other devices.

Examples of operation instruction data to be sent from a control station, e.g. a SCADA server related to a wind turbine to be allocated higher transmission priority, are listed in the following:

"Active power set point". An instruction of setting reactive power to a given value.

"Reactive power set point". An instruction of setting active power to a given value.

"Power Factor set point". An instruction of setting Power Factor (Cos(phi)) to a given value.

"Turbine run state" An instruction of setting turbine run state to a given state, e.g. "off".

It should be noted that many other data than the above-mentioned examples may in accordance to the present invention be allocated higher transmission priority.

The data packets DP1, PD1h may refer to any protocol used with reference to wind turbine SCADA communication systems, e.g. XML-based, MMS, web-services etc. Alternatively it may be a protocol including a priority definition according to the below example.

An example of one of several applicable priority encoding and/or decoding techniques according to FIG. 6a within the scope of the invention is illustrated and described below. The encoding/decoding of a data packet is established with the following protocol syntax: request <SOH>
TurbineID
<STX>
Priority

```
         <ETX>
         RequestID
         <ENQ>
         SequenceID
         <ACK>
         TelegramType
         <BEL>
         WriteTelegramNumber
         <BS>
         WriteTelegramASCIIBinHexMask
         <HT>
WriteValue1 <GS>WriteValue2<GS> . . . WriteValueN
         <LF>
         ReadTelegramNumber
         <VT>
         ReadTelegramASCIIBinHexMask
         <EOT>
```

An answer from the wind turbine controller WTC back to the central control station CS has the following format:

```
         <SOH>
         TurbineID
         <STX>
         Priority
         <ETX>
         RequestID
         <ENQ>
         SequenceID
         <ACK>
         TelegramType
         <BEL>
         WriteTelegramNumber
         <BS>
         WriteTelegramASCIIBinHexMask
         <HT>
WriteValue1Status<GS>WriteValue2Status<GS> ... WriteValueNStatus
         <LF>
         ReadTelegramNumber
         <VT>
         ReadTelegramASCIIBinHexMask
         <FF>
ReadValue1 <FS>ReadValue1 Quality<GS>
ReadValue2<FS>ReadValue2Quality<GS>
ReadValueN<FS>ReadValueNQuality
         <EOT>
```

The <"character"> refers to ASCII control characters according to the ISO/IEC 646 standard (ASCII: American Standard Code for Information Interchange) as listed and shortly explained below.

The decoding is established so as to decode an incoming data packet with respect to priority and ensure that incoming data packets with high priority are recognized and handled accordingly.

The handling of a data packet, at the destination D side of a data packet transmission, involves according to the above syntax first of all that the relevant high priority data are recognized. This may initially be done by a device driver DD related to the current queue or buffer through a decoding of the incoming data packet to extract the priority definition of the data packet read in connection with the control character <STX> according to the above example.

The <"character"> of the above example refers to standard ASCII control characters (ASCII: American Standard Code for Information Interchange) as listed and shortly explained below.

|  | code pos. |  | Unicode |  |  |
|---|---|---|---|---|---|
|  | dec. | hex. | abbr. | name | Description in C0 of ISO 646 |
| ctl-A | 1 | 1 | SOH | START OF HEADING | A transmission control character used as the first character of a heading of an information message. |
| ctl-B | 2 | 2 | STX | START OF TEXT | A transmission control character which precedes a text and which is used to terminate a heading. |
| ctl-C | 3 | 3 | ETX | END OF TEXT | A transmission control character which terminates a text. |
| ctl-D | 4 | 4 | EOT | END OF TRANSMISSION | A transmission control character used to indicate the conclusion of the transmission of one or more texts.. |
| ctl-E | 5 | 5 | ENQ | ENQUIRY | A transmission control character used as a request for a response from a remote station; the response may include station identification and/or station status. When a "Who are you" function is required on the general switched transmission network, the first use of ENQ after the connection is established shall have the meaning "Who are you" (station identification). Subsequent use of ENQ may, or may not, include the function "Who are you", as determined by agreement. |
| ctl-F | 6 | 6 | ACK | ACKNOWLEDGE | A transmission control character transmitted by a receiver as an affirmative response to the sender. |
| ctl-G | 7 | 7 | BEL | BELL | A control character that is used when there is a need to call for attention; it may control alarm or attention devices. |

| code pos. | | Unicode | | | |
|---|---|---|---|---|---|
| dec. | hex. | abbr. | name | | Description in C0 of ISO 646 |
| ctl-H | 8 | 8 | BS | BACKSPACE | A format effector which moves the active position one character position backwards on the same line. |
| ctl-I | 9 | 9 | HT | HORIZONTAL TABULATION | A format effector which advances the active position to the next pre-determined character position on the same line. |
| ctl-J | 10 | A | LF | LINE FEED | A format effector which advances the active position to the same character position of the next line. |
| ctl-K | 11 | B | VT | VERTICAL TABULATION | A format effector which advances the active position to the same character position on the next pre-determined line. |
| ctl-L | 12 | C | FF | FORM FEED | A format effector which advances the active position to the same character position on a pre-determined line of the next form or page. |
| ctl-\ | 28 | 1C | FS | FILE SEPARATOR | A control character used to separate and qualify data logically; its specific meaning has to be specified for each application. If this character is used in hierarchical order, it delimits a data item called a file. |
| ctl-] | 29 | 1D | GS | GROUP SEPARATOR | A control character used to separate and qualify data logically; its specific meaning has to be specified for each application. If this character is used in hierarchical order, it delimits a data item called a group. |

Another example of data transfer specification applicable within the scope of the present invention is the extensible markup language (XML) web services.

XML web services typically use Simple Object Access Protocol (SOAP) for communicating. SOAP is a simple XML based protocol to let applications exchange information over hypertext transfer protocol (HTTP). SOAP is a protocol for accessing a Web Service.

SOAP web services define a way of communicating using Remote Procedure Calls (RPC) over HTTP. SOAP provides a way of communicating between applications running on same or different operating systems, with same or different technologies and programming languages.

An example of a SOAP request and a SOAP response is to be found in the following:

```
SOAP request:
POST / GetActivePowerSetPoint HTTP/1.1
Host: www.WT01.com
Content-Type: text/xml; charset="utf-8"
Content-Length: nnnn
SOAPAction: "Some-URI"
<SOAP-ENV:Envelope
xmlns:SOAP-ENV="http://schemas.xmlsoap.org/soap/envelope/"
SOAP-ENV:encodingStyle="http://schemas.xmlsoap.org/soap/encoding/">
    <SOAP-ENV:Body>
        <m: GetActivePowerSetPoint xmlns:m="Some-URI">
            <symbol>DIS</symbol>
        </m: GetActivePowerSetPoint >
    </SOAP-ENV:Body>
</SOAP-ENV:Envelope>
SOAP response:
HTTP/1.1 200 OK
```

```
-continued

Content-Type: text/xml; charset="utf-8"
Content-Length: nnnn
<SOAP-ENV:Envelope
xmlns:SOAP-ENV="http://schemas.xmlsoap.org/soap/envelope/"
SOAP-ENV:encodingStyle="http://schemas.xmlsoap.org/soap/
encoding/"/>
    <SOAP-ENV:Body>
        <m: GetActivePowerSetPointResponse xmlns:m="Some-URI">
            <Value>2300</Value>
        </m: GetActivePowerSetPointResponse>
    </SOAP-ENV:Body>
</SOAP-ENV:Envelope>
```

The SOAP message may in this way be utilized for retrieving information from to the control station from the wind turbine controller or vice versa. The web service may be located on a web server related to the wind turbine and may be coded in any programming language e.g. C++, C#, Java. The above example is only to constitute one example out of many ways of using SOAP and web services.

It should be stressed that the above specified syntaxes for priority decoding and encoding merely represent one of several applicable embodiments within the scope of the invention.

Figure 6B:
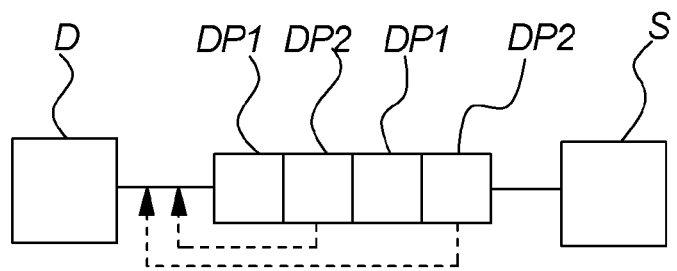
FIG. 6b illustrates a further embodiment of the invention where priority between data packets is obtained through application of two different protocols and FIG. 7 illustrates an embodiment of the invention including a further network.

FIG. 6b illustrates a further embodiment of the invention where priority between data packets is obtained through application of two different protocols; one applied for low priority data and one applicable for high priority data.

This figure illustrates an abstract overview of an example priority of data packets by means of two different protocols according to an embodiment of the invention. The figure illustrates a source S, a destination D, data packets of protocol 1 DP1 and data packets of protocol 2 DP2.

The figure illustrates an example where a number of data packets of protocol 1 DP1, and data packets of protocol 2 DP2 in a queue or buffer, are transmitted from a source S to a destination D. According to the prior art these queues or buffers are using the FIFO principles (First In, First Out), where all data bytes received in a particular sequence are further transmitted in that same order. The data packets of protocol 2 DP2 are according to the invention moved to a leading position and in this way processed at the destination D faster than other data packets DP1 which will typically comprise low priority data.

The illustrated priority dependent handling of data with reference in FIGS. 5a and 6b may according to the invention be carried out by a piece of software or hardware, e.g. a device driver DD, related to any queue, buffer or intersection point in a wind turbine SCADA system. Examples are data ports DP, input buffers IBUF, output buffers OBUF, queues etc.

Figure 7:
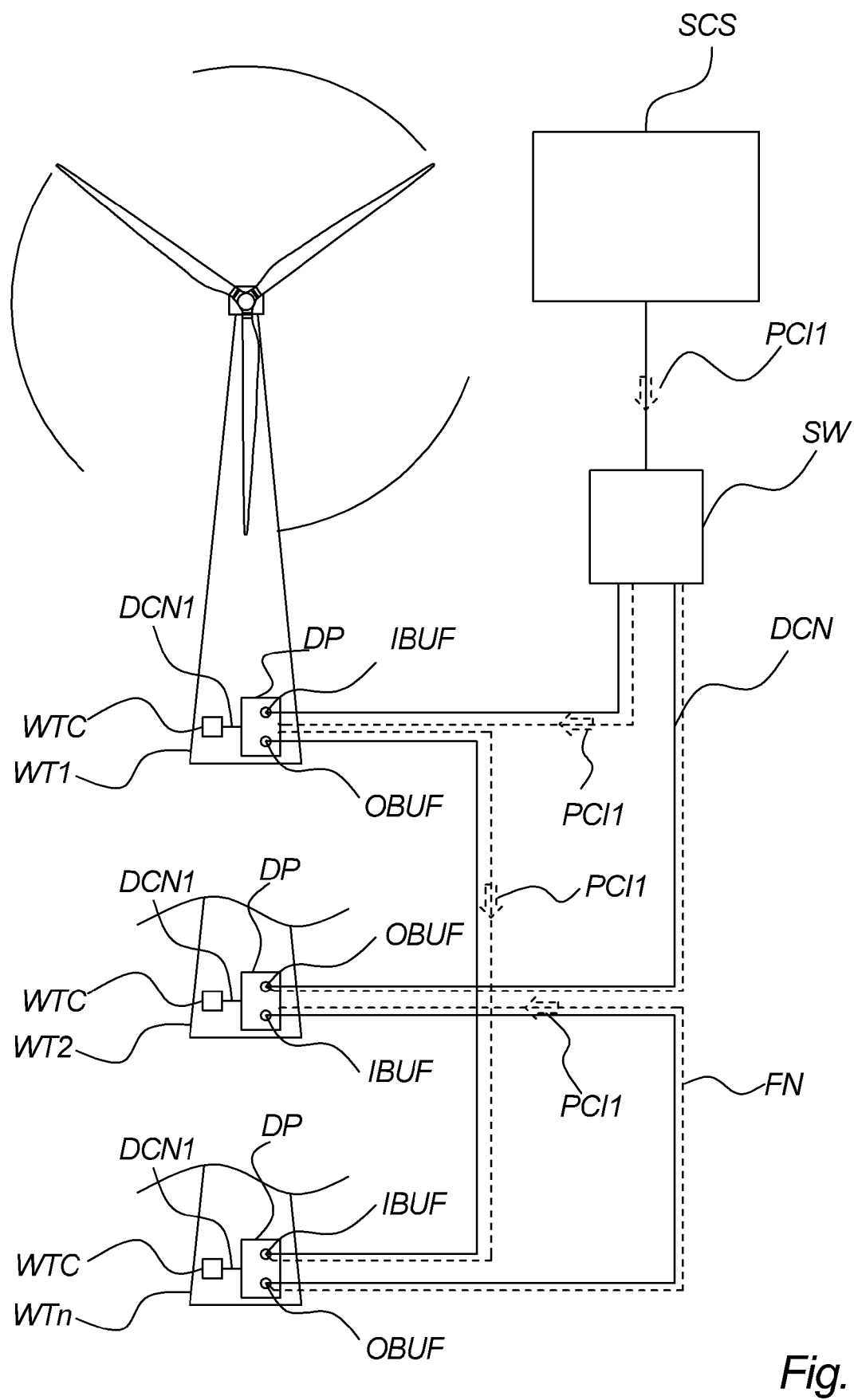

FIG. 7 illustrates a further embodiment of the invention where a priority of power related control network has been established by establishing a separate dedicated network for high priority data packets.

The figure illustrates the data network of a wind park according to one embodiment of the invention. The figure illustrates a number of wind turbines WT1, WT2, ..., WTn, a central control station CS, a switch SW. Each of the wind turbines WT1, WT2, ..., WTn is related to a wind turbine controller WTC and a data port DP related to an input buffer IBUF and an output buffer OBUF. Furthermore, the figure illustrates power control instructions PCI1, and data communication networks DCN, DCN1.

The central control station CS may according to an embodiment of the invention be related to a SCADA server.

The central control station CS may in an embodiment of the invention e.g. generate a power control instruction PCI1 that in this example comprises an instruction to wind turbine no. two WT2. This power control instruction PCI1 comprises at least one data packet that may comprise power control related data PCRD and/or monitoring and control data. MCD.

The wind turbine controllers and the data ports may be located inside the related wind turbines WT1, WT2, ..., WTn, e.g. in the tower, the nacelle etc., or it may be located outside the wind turbines WT1, WT2, ..., WTn.

According to this embodiment of the invention a direct route for high priority power control related data PRDC may be established by means of additional cables/network to all wind turbines of a wind farm. The cabling may be parallel or series-connected like the illustrated daisy chaining. This extra network will then constitute a network that is only used for transmitting important and critical data, such as power control related data PCRD. This way the critical data will never be delayed due to less critical data occupying the network. According to the present figure there may evidently exist a wind turbine switch for each wind turbine as it is the case with reference to FIG. 4.

What is claimed is:

1. A system of at least two distributed wind turbines connected by a data communication network wherein
said data communication network communicates at least monitoring and control data and power control related data to and from said at least two wind turbines,
said power control related data is assigned a higher transmission priority than a subset of said monitoring and control data,
said transmission priority is defined in relation to a protocol, wherein
said protocol has a higher transmission priority.

2. A system of at least two distributed wind turbines according to claim 1, wherein said power control related data having high transmission priority comprises information of active power.

3. A system of at least two distributed wind turbines according to claim 1, wherein said power control related data having high transmission priority comprises information of reactive power.

4. A system of at least two distributed wind turbines according to claim 1, wherein said power control related data having high transmission priority comprises Power Factor regulation data.

5. A system of at least two distributed wind turbines according to claim 1, wherein said monitoring and control data are transmitted to and from said at least two wind turbines via a data communication network.

6. A system of at least two distributed wind turbines according to claim 1, wherein said data communication network is a copper, fiber or wireless network or a combination of these.

7. A system of at least two distributed wind turbines according to claim 1, wherein said power control related data having higher transmission priority is transmitted via a further network.

8. A system of at least two distributed wind turbines according to claim 1, wherein the monitoring and control data and the power control related data having higher transmission priority is transmitted via the same data communication network as data packets having different priorities.

9. A system of at least two distributed wind turbines according to claim 1, wherein said at least two wind turbines comprise means for encoding data packets including a specification of priority level.

10. A system of at least two distributed wind turbines according to claim 1, wherein said at least two wind turbines comprise means for decoding data packets including a detection of priority level.

11. A system of at least two distributed wind turbines according to claim 1, wherein said power control related data comprises a representation of one or more measurements relating to the wind turbine.

12. A system of at least two distributed wind turbines according to claim 1, wherein said monitoring and control data is transmitted as data packets associated with priorities.

13. A system of at least two distributed wind turbines according to claim 1, wherein said monitoring and control data are transmitted as data packets associated with priorities and wherein said data packets are encoded according to a single protocol incorporating priorities.

14. A system of at least two distributed wind turbines according to claim 1, wherein said monitoring and control data are transmitted as data packets associated with priorities and wherein said data packets are encoded according to at least two different protocols and wherein the different protocols designates different corresponding priorities.

15. A system of at least two distributed wind turbines according to claim 1, wherein said monitoring and control data are transmitted as data packets of a single protocol associated with priorities and wherein said priorities are defined within said protocol.

16. A system of at least two distributed wind turbines according to claim 1, wherein said system is a part of a Supervisory Control And Data Acquisition (SCADA) system at least partly.

17. A system of at least two distributed wind turbines according to claim 1, further comprising at least one data buffer buffering said monitoring and control data and power control related data, wherein said buffering of monitoring and control data and power control related data is dependent on priorities of said data, and wherein power control related data having a higher transmission priority is moved to a leading position in the data buffer.

* * * * *